United States Patent [19]

Ferrari

[11] Patent Number: 4,543,826
[45] Date of Patent: Oct. 1, 1985

[54] ULTRASONIC ACOUSTIC IMAGING APPARATUS

[75] Inventor: Leonard A. Ferrari, San Clemente, Calif.

[73] Assignee: The Regents of the University of California, Berkeley, Calif.

[21] Appl. No.: 384,553

[22] Filed: Jun. 3, 1982

[51] Int. Cl.⁴ ............................................ G01N 29/00
[52] U.S. Cl. ...................................... 73/602; 73/620; 73/629; 128/660
[58] Field of Search ............................... 128/660-663, 128/602; 73/618-626

[56] References Cited

U.S. PATENT DOCUMENTS 4,228,804 10/1980 Holasek et al. ...................... 128/660
4,230,124 10/1980 Pickering et al. ................... 128/660
4,318,413 3/1982 Iinuma et al. ........................ 128/660

OTHER PUBLICATIONS

Chivers, R. C. et al., "Frequency Dependence of UTS Backscattering Cross-Sections: An Indicator of Tissue Structure Characteristics" Conf. 2nd World Congress on UTS in Medicine, Rotterdam, Netherlands, Jun. 4-8, 1973, pp. 300-303.

Tremewan, R. N. et al., "A Pulsed Doppler System Incorporated into a Diasonograph", UTS in Med. & Biol., vol. 2, No. 4, pp. 327-330, 1977.

*Primary Examiner*—Kyle L. Howell
*Assistant Examiner*—Francis J. Jaworski
*Attorney, Agent, or Firm*—Poms, Smith, Lande & Rose

[57] ABSTRACT

Acoustical images are generated by frequency demodulating an electrical signal having frequency deviations corresponding to the scattering properties of a media supporting acoustic pulse propagation against which the signal is projected. The system includes a transmitter which generates a signal at a defined frequency, which signal is then transformed into an acoustic pressure signal and projected against the media by a transducer. The transducer also receives acoustic pressure signals reflected from the media. A receiver coupled to the transducer transforms the reflected acoustic pressure signals into electrical signals which are then frequency demodulated. The demodulated signal contains instantaneous frequency deviations responsive to the scattering properties of the media. The frequency demodulated signal may be processed by circuitry to generate a video signal, which is then algorithmically processed by a scan converter and displayed on a video screen. The frequency demodulation may be done by a conventional frequency demodulator, by a V-demodulator, or any other frequency demodulation process. The frequency demodulated signal may also be combined with an amplitude demodulated signal to produce linear or nonlinear combinations of frequency demodulated and amplitude demodulated images. Frequency demodulated and amplitude demodulated signals may be used to provide color images of the media.

11 Claims, 12 Drawing Figures

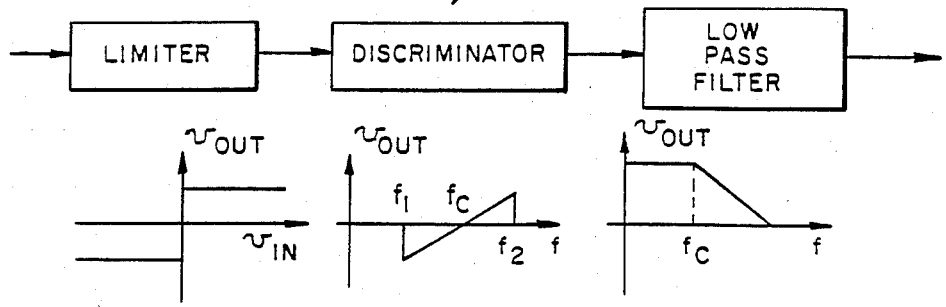
Fig. 3.a
Fig. 3.b  Fig. 3.c  Fig. 3.d
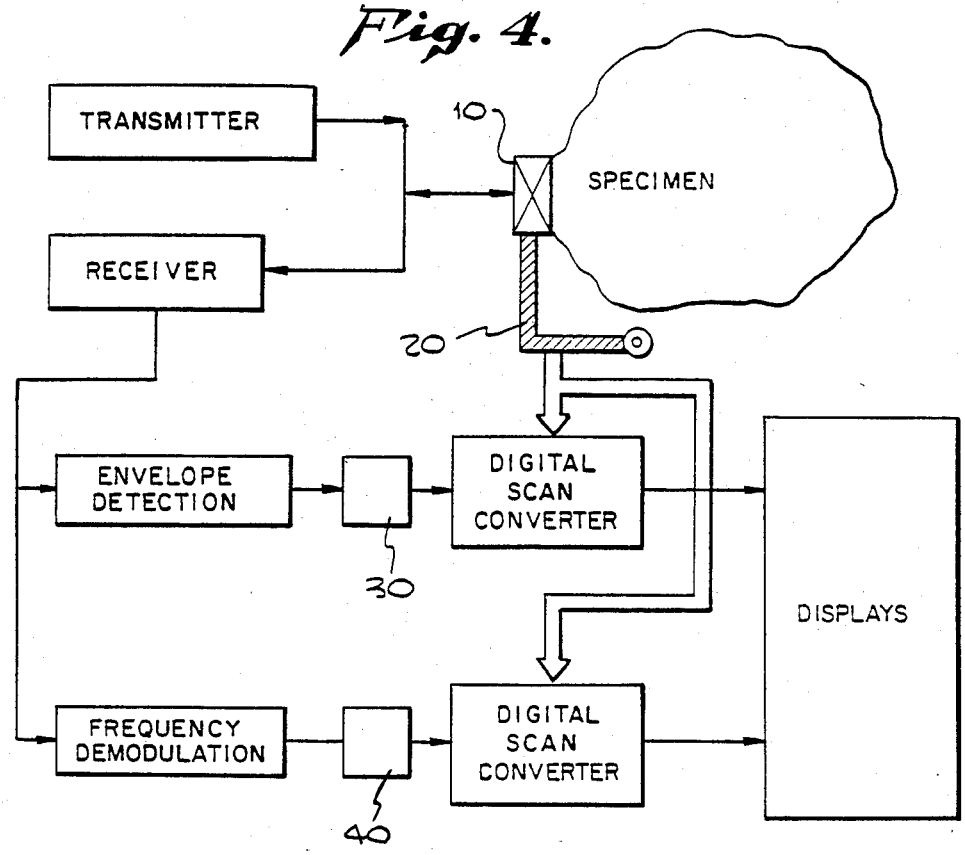
Fig. 4.

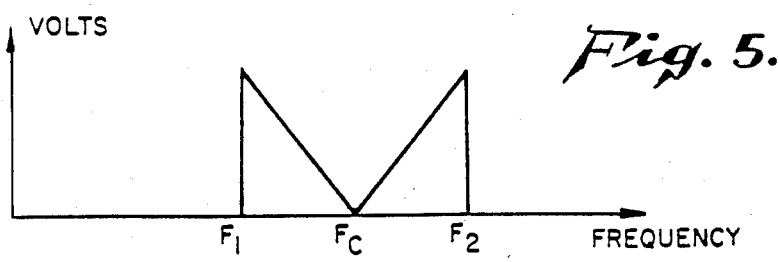
Fig. 5.
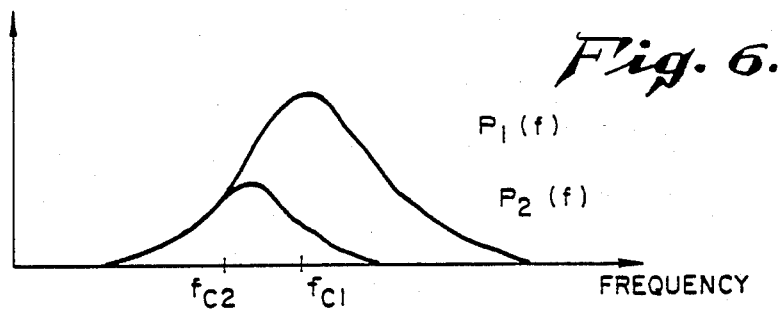
Fig. 6.
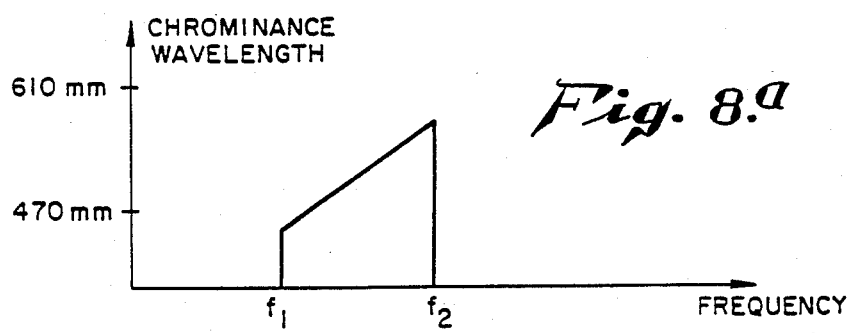
Fig. 8.ᵃ
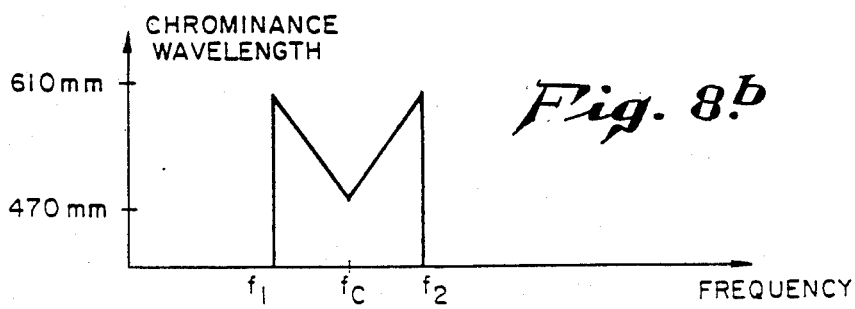
Fig. 8.ᵇ

ULTRASONIC ACOUSTIC IMAGING APPARATUS

FIELD OF THE INVENTION

The present invention relates to the frequency demodulation of ultrasound signals to produce acoustic images of media supporting acoustic pulse propagation.

BACKGROUND OF THE INVENTION

The scattering properties of tissue are such that amplitude and instantaneous frequency deviations are induced in the backscattered echo signals. The instantaneous frequency of the ultrasound signal is defined as the time rate of change of the signal's phase. Most conventional ultrasound systems generate images based upon amplitude fluctuations in these ultrasonic waves reflected from the tissue. While the amplitude varations induced by the tissue are useful for determining the boundaries of various body organs and also provide some textural information, instantaneous frequency variations induced by the tissue lead to frequency demodulated images that may be more useful than the amplitude demodulated images in characterizing the textural information.

Nearly all conventional ultrasound systems have a block diagram which is similar conceptually to that shown in FIG. 1. Such systems are referred to as "B-scanners," echo scanners or real time ultrasound scanners. These scanners project an acoustic pressure signal, in the form of an ultrasonic pulse, against the object, and measure the acoustic pressure signal resulting from the scattering of the ultrasonic pulse along its path of propagation—i.e., the ultrasonic "echo" signals. These ultrasonic echo signals are referred to as "A-lines."

Referring to FIG. 1, the ultrasonic pulse is usually generated by a transmitter and transformed into an acoustic pressure signal by a transducer 10 mounted upon an arm 20 moved relative to the object to project the acoustic pressure signal against various parts of the organ. The transducer 10 is also connected to a receiver which measures the ultrasonic echoes. The output of the receiver is connected to an envelope detector, which is an amplitude demodulator. The envelope detector removes the high frequency component of the reflected signal. The output of the envelope detector is connected to conventional circuit means 30 to generate a video signal containing acoustic images of the specimen. The output circuit 30 is coupled to a digital scan converter. The scan converter is also coupled to the arm 20 upon which the transducer 10 is mounted, in order to receive positional information. Digital scan converters, as known in the art, algorithmically process video signals by a predefined algorithm to generate an image of the entire specimen. The output of the digital scan converter is then displayed on a conventional cathode ray display.

Careful analysis of the signal received by conventional B-scanners reveals a substantial amount of instantaneous frequency deviation in the RF "carrier" portion of the signal, i.e., the high frequency components. Instantaneous deviations of plus or minus 500 Khz on a center frequency of 3 Mhz have been measured. However, the prior art does not teach any useful means of using this information.

Accordingly, it is the principal object of the present invention to use the instantaneous frequency deviations of the backscattered signal which are dependent on the scattering properties of media supporting acoustic pulse propagation to generate acoustical images of the media.

A further object of the present invention is to generate acoustic images of media utilizing the instantaneous frequency deviations of signals derived from reflected ultrasonic waves.

Yet another object of the present invention is to generate color ultrasonic images based on the deviations in amplitude and frequency in backscattered ultrasonic signals.

SUMMARY OF THE INVENTION

The present invention, in a broad aspect, provides a system for generating an electrical signal having instantaneous frequency deviations corresponding to the scattering properties of a media supporting acoustic pulse propagation. The system includes a transmitter which generates a signal at a defined frequency, which is then transformed by a transducer into an ultrasonic acoustic pressure signal. The transducer projects the acoustic pressure signal against the media and receives reflected acoustic pressure signals from the media. The transducer transforms the reflected acoustic pressure signals into electrical signals which are amplified by a receiver. A frequency demodulator circuit, coupled to the receiver, frequency-demodulates the electrical signal from the receiver to produce a frequency demodulated signal corresponding to the scattering properties of the object.

In accordance with one feature of the invention, the frequency demodulator circuit includes a limiting circuit, a discriminator circuit, and a low pass filter. The limiting circuit limits the amplitude of the electrical signal produced by the receiver. The discriminator circuit converts the amplitude limited signal with the instantaneous frequency deviations to a discriminated signal having positive and negative voltage amplitudes corresponding to positive and negative instantaneous frequency deviations relative to the defined frequency. The low pass filter eliminates the high frequencies from the discriminated signal.

In accordance with another feature of the invention, the discriminator in the frequency demodulator can be replaced with a V-discriminator which generates a symmetric output characteristic.

In accordance with yet another feature of the invention, the output of the frequency demodulator can be connected to the input of a scan converter. The scan converter is responsive to the position of the transducer relative to the media and algorithmically generates images of the media. A display connected to the scan converter thereafter visually displays the acoustic images.

In accordance with yet another feature of the invention, both amplitude and frequency demodulated acoustic images can be visually displayed by coupling the output of the receiver to both an amplitude demodulator and to a frequency demodulator. The amplitude demodulator produces an amplitude demodulated signal having amplitude deviations from the amplitude of the projected signal responsive to the scattering properties of the media. Thereafter, the video signals produced from the amplitude and frequency demodulators are coupled to scan converters where they are algorithmically encoded prior to being displayed.

In accordance with a further feature of the invention, color acoustic images of the media can be generated by utilizing the video signals from the frequency and amplitude demodulators as the luminance and chrominance signals to a color television system.

Other objects, features and advantages of the present invention will become apparent from a consideration of the following detailed description and the accompanying drawings.

BRIEF DESCRIPTION OF THE DRAWINGS

FIG. 3a is a schematic diagram of the frequency demodulation portion of the system shown in FIG. 2;

FIGS. 3b-3d are graphs of the output characteristics of the circuit elements shown in FIG. 3a;

FIG. 4 is a schematic diagram of another embodiment of an acoustic imaging system according to the present invention and employing both frequency demodulation and amplitude demodulation;

FIG. 5 is a graph of the output characteristics of an alternate embodiment of the frequency demodulation circuit shown in the system of FIG. 2;

FIG. 6 is a graph showing the power spectrum of a pulse propagating in an attenuating and dispersive medium;

FIGS. 8a and 8b respectively are graphs of the output characteristics of the frequency demodulation circuit element shown in FIG. 7, for the two other embodiments of the present invention.

DETAILED DESCRIPTION

Figure 1:
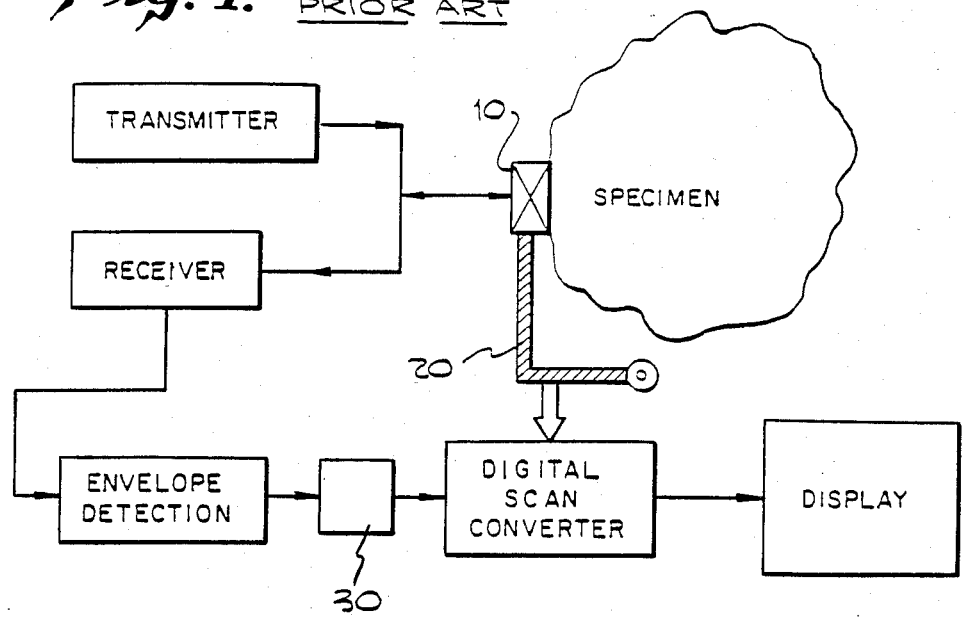
FIG. 1 is a schematic diagram of a prior art acoustical imaging system employing amplitude demodulation.

Referring more particularly to the drawings, FIG. 1 shows, as described, a conventional acoustic imaging system employing amplitude modulation to generate acoustical images based upon reflections of ultrasonic pulses projected by the system against media supporting acoustic pulse propagation. The present invention discloses a new imaging modality for ultrasound based upon the carrier zero crossing fluctuations either by frequency demodulation or by frequency demodulation combined with amplitude demodulation. The present invention takes full advantage of the fact that an ultrasonic pulse propagating in tissue is subjected to frequency dependent attenuation.

Figure 2:
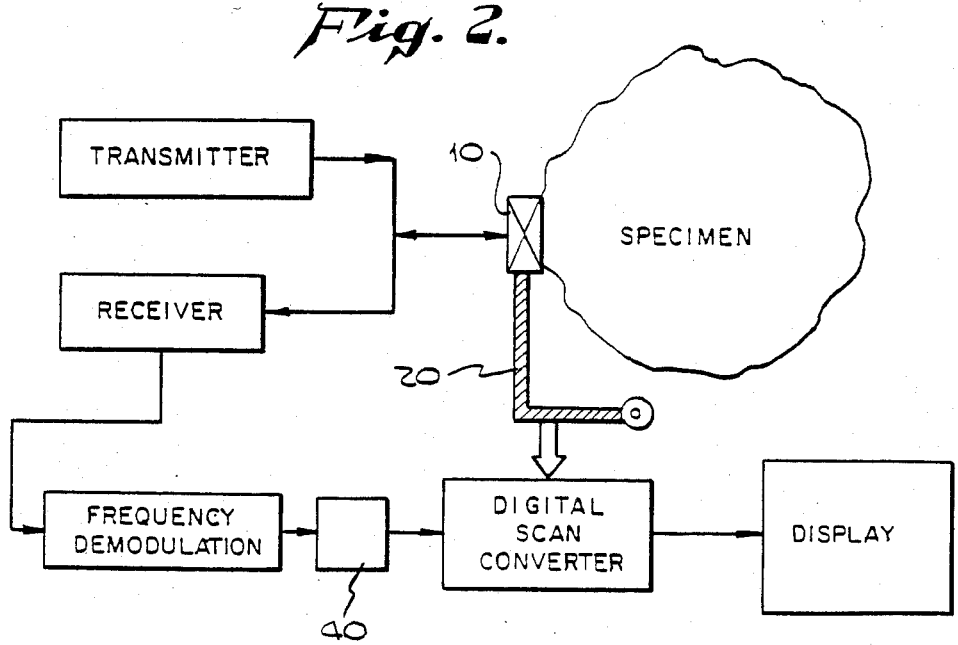
FIG. 2 is a schematic diagram of one embodiment of an acoustic imaging system according to the present invention and employing frequency demodulation.

FIG. 2 shows the first, and basic, embodiment of the present invention. In this embodiment, the envelope detection or amplitude demodulation element of FIG. 1 has been replaced with a frequency demodulation circuit. The frequency demodulation circuit is any conventional system composed of a limiter, frequency discriminator, and low pass filter as shown in FIG. 3a. The other elements of FIG. 2 are the conventional elements shown in FIG. 1. A conventional circuit element 40, is inserted between the frequency demodulation circuit and the digital scan converter to produce a video signal based upon the output of the frequency demodulator.

In the system of FIG. 2, the transmitter generates an electrical pulse which is then transformed into an ultrasonic acoustic pulse by the transducer 10 and projected against the specimen or media. The electrical signal produced by the transmitter is a pulse having a predefined amplitude and a predefined frequency or pulse repetition rate. The transducer 10 is mounted on an arm 20 which is moved relative to the specimen to project the pulse against various portions thereof. The reflections of the ultrasonic pulse from the transmitter generated by the specimen are also detected by the transducer 10 and routed to the receiver. The receiver transforms the acoustic pressure reflections into an electrical signal for processing by the frequency demodulator.

The frequency demodulator is shown in more detail in FIG. 3a. The frequency demodulator comprises a limiter circuit, a discriminator circuit and a low pass filter circuit, whose output characteristics are respectively shown in FIGS. 3b, 3c, and 3d. The limiter circuit limits the amplitude of the electrical signal from the receiver, and is a conventional circuit. The amplitude limited signal produced by the limiter thereafter is passed to the conventional discriminator, which may be similar to the discriminator used in FM receivers. As known in the art, a discriminator converts the instantaneous frequency deviations in a signal to voltage deviations. Accordingly, the instantaneous frequency deviations which are present in the signal that is reflected from the specimen are converted to positive and negative voltage amplitudes corresponding to positive and negative instantaneous frequency deviations relative to the frequency of the ultrasonic pulse, with the frequency of the ultrasonic pulse producing a zero voltage amplitude.

The low pass filter coupled to the discriminator is also a conventional element as known in the art. The purpose of the low pass filter is to remove the unwanted high frequency components from the discriminated signal produced by the discriminator.

The output of the low pass filter is thereafter passed to the circuit element 40 for encoding into a video format by means known in the art. The output of the circuit 40 is thus a video signal having acoustical images of the specimen. This video signal is thereafter passed to the digital scan converter which may be programmed, as known in the art, with algorithms to process the video signal. These algorithms are basically digital filters which, in effect, "average" the various reflections received from any point on the specimen. Digital enhancement of the image of the specimen may also be performed in the scan converter. The output of the scan converter is thereafter coupled to the conventional display, which produces a line by line image.

The frequency demodulated images produced with the present invention are different in appearance from the amplitude demodulated images. The shading in the frequency demodulated images results from a shift in the pulse carrier frequency which is induced by the attenuation properties of the media. Accordingly, the frequency demodulated images more accurately indicate media attenuation than do amplitude demodulated images. The sources of shift in the A-line average frequency (i.e. frequency modulation) are coherent interference introduced by (a) scatterers spaced at appropriate distances; (b) changes in absorption as a function of, among other things, spatial location; and (c) velocity fluctuations. The images contain fine and coarse structures quite different from those in conventional acoustic images and present a new and medically significant image modality.

FIG. 4 shows the system of FIG. 2 when combined with the conventional system of FIG. 1. In this system, the output of the receiver is coupled to both the envelope detector and the frequency demodulator. The positional indication from the arm 20 supporting the transducer 10 is fed to two digital scan converters. With this system, the output of the envelope detection circuit is a signal having amplitude deviations from the amplitude of the pulse produced by the transmitter responsive to the scattering properties of the specimen. The output of the frequency demodulator is as described previously. The two digital scan converters perform the function of defining a given image location grey scale according to an appropriate algorithm and the positional information of the transducer. The display generated with the system of FIG. 4 consists of separate images of linear or nonlinear combinations of the amplitude demodulated and frequency demodulated images. Separate algorithms may be used in the digital scan converters to enhance the frequency demodulated and amplitude demodulated images. The combining of the amplitude demodulated and frequency demodulated images may be done by simple summation.

An alternate embodiment to the frequency demodulation circuits reflected in FIGS. 2 and 4 is shown graphically in FIG. 5. FIG. 5 reflects a V-demodulation system. The substitution of a V type demodulator for the frequency demodulator of FIGS. 2 and 4 involves only the substitution of a discriminator circuit having the characteristic shown in FIG. 5 for the discriminator circuit of FIG. 3a The circuitry to generate the response shown in FIG. 5 is conventional and has not been shown in the figures. The use of V-demodulation may produce images more useful than either the amplitude or purely frequency demodulated images because it has been found that both negative and positive carrier frequency deviations in the reflected signal are equally likely. That is, the various elements in the specimen causing scattering of the reflected ultrasonic signals cause interference phenomena which deviate the carrier in a direction upward or downward depending on the location of the scattering sites.

The V-demodulation is still basically frequency demodulation utilizing a different discriminator circuit. When the frequency demodulator shown in FIGS. 2 and 4 is replaced with the V-demodulator having the characteristic of FIG. 5, the resulting demodulated output signal may better represent scattering site locations than the frequency demodulation with the circuit of FIG. 3a because the negative and positive carrier deviations generate a symmetric output characteristic. The determination of $f_c$ shown in FIG. 5 is complicated by the fact that with the V-demodulation, $f_c$ is a function of spatial location because a pulse propagating in an attenuating and dispersive medium has its power spectrum (and its $f_c$) shifted downward as shown in FIG. 6. Using zero crossing averaging techniques, an estimate of the RMS frequency of the pulse Fourier transform as a function of the spatial location can be determined. Given the pulse bandwidth, an estimate of the carrier frequency from the value for the RMS frequency obtained by the zero crossing averaging technique can be obtained. This computed value is then used in the V-discriminator reflected by the graph shown in FIG. 5.

Figure 7:
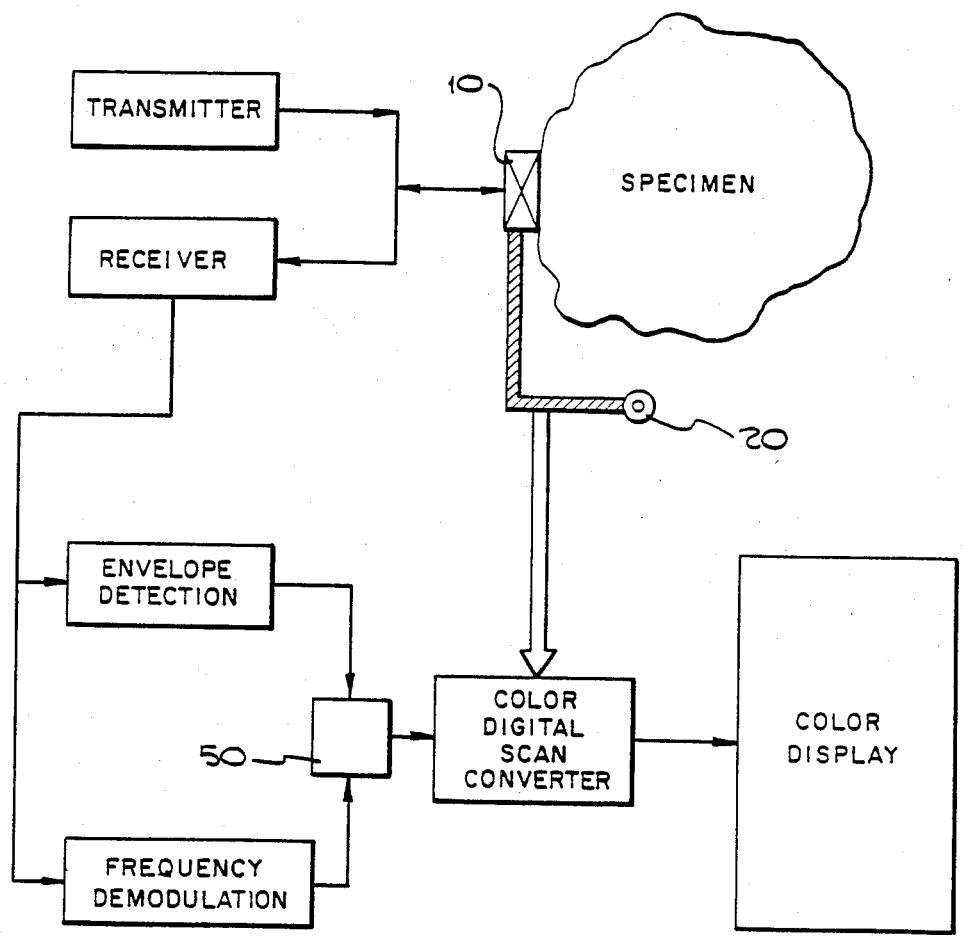
FIG. 7 is a generic schematic diagram of two other embodiments of an acoustic imaging system according to the present invention and employing both frequency demodulation and amplitude demodulation to produce color images.

The present invention can also be used to produce color ultrasonic acoustic images of a specimen, as shown in FIG. 7. The previous embodiment of the present invention reflected in FIG. 4 used both frequency demodulation and amplitude demodulation to generate grey scale ultrasonic images. However, the system of FIG. 4 also provides the basis for generating color ultrasonic images by combining the information obtained with frequency demodulation with the envelope detected information.

As known in the art, the generation of color video images requires a luminance signal and a chrominance signal. The luminance, or "black and white" information determines the instantaneous brightness of the color beams as they are scanned over the video screen. The chrominance, or "color" information is made up up of the red, blue and green signals required to drive the video display tube, minus the luminance signal.

According to the present invention, color video images can be provided by using the amplitude demodulated signal to provide the luminance or grey scale information and using the frequency demodulated signal to provide the color or chrominance information in the image. Conversely, the amplitude demodulated signal could be used to provide the chrominance information, and the frequency demodulated signal be used to provide the luminance information.

A diagram of a color system is shown in FIG. 7. As before, the various circuit elements are conventional and have only been shown in block diagram form. The envelope detection and frequency demodulation are done as described previously. The frequency demodulation element is similar to that shown in FIG. 3a. The luminance and chrominance signals produced by the amplitude and frequency demodulation drive a conventional circuit 50, as known in the art, to produce a color video image, which is thereafter stored on a color digital scan converter and displayed on a color display. Analog and digital techniques for encoding the luminance and chrominance image information for display are conventional and are not set forth in detail herein.

In the case where the luminance information is being provided via amplitude demodulation, and the chrominance information via frequency demodulation, the frequency demodulator circuit of FIG. 3b is modified with a color "FM" discriminator having a characteristic as shown in FIG. 8a, or by a color "V-discriminator" as shown in FIG. 8b. Circuitry to produce the output characteristic shown in FIGS. 8a and 8b is conventional and thus has not been shown herein. The advantages of the V-discrimination technique relative the purely frequency discrimination technique have been discussed previously. The use of a V-demodulation technique may more accurately represent the scattering site locations than the pure frequency demodulation.

The difference between the discriminators having the output characteristics reflected in FIGS. 8a and 8b is that, in FIG. 8a, the chrominance wavelength output varies linearly between 470 nm and 610 nm in response to positive and negative frequency deviations relative to the carrier frequency of the pulse.

By contrast, in FIG. 8b, the chrominance wavelength increases in response to both negative and positive deviations from the carrier frequency, with the carrier frequency itself producing the lowest wave length.

With the foregoing techniques, frequency demodulated and amplitude demodulated ultrasound A-line data may be used as both the chrominance and luminance components to produce a full color image display. Furthermore, V-demodulated and amplitude demodulated ultrasound A-line data may also be used as the chrominance and luminance components of a full color image display. As stated previously, the amplitude demodulated and frequency or V-demodulated signals may be interchanged to produce the luminance and chrominance components.

In the foregoing description of the present invention, several embodiments of the invention have been disclosed. It is to be understood that other design variations are within the scope of the present invention. Accordingly, the present invention is not limited to the particular arrangements which have been illustrated and described in detail herein.

What is claimed is:

1. A system for generating an electrical signal having instantaneous frequency deviations corresponding to the scattering properties of a media supporting acoustic pulse propogation against which said signal is electrically projected, comprising:

transmitter means for generating a signal at a defined frequency;

transducer means, coupled to said transmitter means, for transforming said electrical signal into an ultrasonic acoustic pressure signal, for projecting said acoustic pressure signal against said media, and for receiving acoustic pressure signals reflected from said media in response to said projected acoustic pressure signal;

receiver means, coupled to said transducer means, for transforming said reflected acoustic pressure signal into an electrical signal;

frequency demodulation means, coupled to said receiver means, for frequency demodulating said electrical signal of said receiver means to produce a frequency demodulation signal containing instantaneous frequency deviations from said defined frequency responsive to the scattering properties of said media from stationary and moving structures therein; and display means, coupled to the output of said frequency demodulation means, said display means being adapted for display of a cross-sectional image of said media representative of the instantaneous frequency deviation characteristics of both stationary and moving structures in said media.

2. A system as defined in claim 1, wherein said frequency demodulation means comprises:

limiting means for limiting the amplitude of said electrical signal produced by said receiver means, thereby producing an amplitude-limited signal;

discriminator means, coupled to said limiting means, for converting said amplitude limited signal with said instantaneous frequency deviations to a discriminated signal having positive and negative voltage amplitudes corresponding to positive and negative instantaneous frequency deviations relative to said defined frequency, with said defined frequency producing zero voltage amplitude; and low pass filter means, coupled to said discriminator means, for eliminating high frequencies from said discriminated signal, thereby producing a filtered signal.

3. A system as defined in claim 1, wherein said frequency demodulation means comprises:

limiting means for limiting the amplitude of said electrical signal produced by said receiver means, thereby producing an amplitude-limited signal;

discriminator means, coupled to said limiting means, for converting said amplitude limited signal with said instantaneous frequency deviations to a discriminated voltage signal having positive voltage amplitudes corresponding to both positive and negative instantaneous frequency deviations relative to said defined frequency, with said defined frequency producing a zero voltage amplitude; and low pass filter means, coupled to said discriminator means, for eliminating high frequencies from said discriminated signal, thereby producing a filtered signal.

4. A system for displaying frequency demodulated acoustic images of an object, comprising:

transmitter means for generating a signal at a defined frequency;

transducer means, coupled to said transmitter means, for transforming said electrical signal into an ultrasonic acoustic pressure signal, for projecting said acoustic pressure signal against said object, and for receiving acoustic pressure signals reflected from said object in response to said projected acoustic pressure signal;

receiver means, coupled to said transducer means, for transforming said reflected acoustic pressure signal into an electrical signal;

frequency demodulation means, coupled to said receiver means, for frequency demodulating said electrical signal of said receiver means to produce a frequency demodulated signal containing instantaneous frequency deviations from said defined frequency responsive to the scattering properties of stationary and moving structures of said object;

circuit means, coupled to said frequency demodulator means, for transforming said frequency demodulated signal into a video signal containing acoustic images of stationary and moving structures of said object;

scan converter means, coupled to said video signal and responsive to the position of said transducer relative to said object, for algorithmically processing said images of said object; and display means, coupled to said scan converter means, for displaying said algorithmically processed images of said object produced by said scan converter means.

5. A system for displaying frequency and amplitude demodulated acoustic images of an object, comprising:

transmitter means for generating an electrical signal at a defined frequency and amplitude;

transducer means, coupled to said transmitter means, for transforming said electrical signal into an ultrasonic acoustic pressure signal, for projecting said acoustic pressure signal against said object, and for receiving acoustic pressure signals reflected from said object in response to said projected acoustic pressure signal;

receiver means, coupled to said transducer means, for transforming said reflected acoustic pressure signal into an electrical signal;

frequency demodulation means, coupled to said receiver means for frequency demodulating said electrical signal of said receiver means to produce a frequency demodulated signal containing instantaneous frequency deviations from said defined frequency responsive to the scattering properties of stationary and moving structures of said object;

first circuit means, coupled to said frequency demodulation means, for transforming said frequency demodulated signal into a first video signal containing acoustic images of stationary and moving structures of said object;

first scan converter means, coupled to said first video signal and responsive to the position of said transducer means relative to said object, for algorithmically encoding said first video signal;

amplitude demodulation emans, coupled to said receiver means, for amplitude demodulating said electrical signal of said receiver means to produce an amplitude demodulated signal having amplitude deviations from said defined amplitude responsive to said scattering properties of said object;

second circuit means, coupled to said amplitude demodulated signal, for encoding said signal into a second video signal containing acoustic images of stationary and moving structures of said object;

second scan converter means, coupled to said second video signal and responsive to the position of said transducer means relative to said object, for algorithmically encoding said second video signal; and display means, coupled to said first and second scan converter means, for displaying said algorithmically encoded signals, thereby displaying acoustic images of said object responsive to both frequency and amplitude deviation properties of said object.

6. A system for displaying color acoustic images of an object, comprising:

transmitter means for generating an electrical signal at a defined frequency and amplitude;

transducer means, coupled to said transmitter means, for transforming said electrical signal to an ultrasonic acoustic pressure signal against said object, and for receiving acoustic pressure signals reflected from said object in response to said projected acoustic pressure signal;

receiver means, coupled to said transducer means, for transforming said reflected acoustic pressure signal into an electrical signal;

frequency demodulation means, coupled to said receiver means, for frequency demodulating said electrical signal of said receiver means to produce a first color signal containing frenquency deviations from said defined frequency responsive to the scattering properties of said object;

first circuit means, coupled to said frequency demodulation means, for encoding said first color signal into a first video signal containing acoustic images of said object;

amplitude demodulation means, coupled to said receiver means, for amplitude demodulating said electrical signal of said receiver means to produce a second color signal having amplitude deviations from said defined amplitude responsive to the scattering properties of said object;

second circuit means, coupled to said amplitude demodulation means, for encoding said second color signal into a second color video signal containing acoustic images of said object;

scan converter means, coupled to said first and second video signals and responsive to the position of said transducer means relative to said object for algorithmically processing said first and second video signals; and display means, coupled to said scan converter means, for displaying said first and second video signals, thereby providing color acoustic images of said object.

7. A system as defined in claim 6, wherein:
said first color signal is a chrominance signal; and
said second color signal is a luminance signal.

8. A system as defined in claim 6, wherein:
said first color signal is a luminance signal; and
said second color signal is a chrominance signal.

9. A system as defined in claim 7, wherein said frequency demodulation means comprises:

limiting means for limiting the amplitude of said electrical signal produced by said receiver means, thereby producing an amplitude-limited signal;

color discriminator means, coupled to said limiting means, for converting said amplitude limited signal with said frequency deviations into a discriminated signal having a chrominance wavelength between an upper and a lower limit and varying linearly between said limits in response to positive and negative frequency deviations relative to said defined frequency, with said defined frequency producing a chrominance wavelength between said limits; and low pass filter means, coupled to said discriminator means, for eliminating high frequencies from said discriminated signal, thereby producing a filtered signal.

10. A system as defined in claim 7, wherein said frequency demodulation means comprises:

limiting means for limiting the amplitude of said electrical signal produced by said receiver means, thereby producing an amplitude-limited signal;

color discriminator means, coupled to said limiting means, for converting said amplitude limited signal with said frequency deviation to a discriminated signal having a chrominance wavelength between an upper and a lower limit, with said defined frequency producing a chrominance wavelength at said lower limit, and said chrominance wave length varying linearly from said lower limit to said upper limit in response to positive and negative frequency deviations relative to said defined frequency; and low pass filter means, coupled to said discriminator means, for eliminating high frequencies from said discriminated signal, thereby producing a filtered signal.

11. A system for displaying frequency and amplitude demodulated acoustic signals of an object, comprising:

transmitter means for generating an electrical signal at a defined frequency and amplitude;

transducer means, coupled to said transmitter means, for transforming said electrical signal into an ultrasound acoustic pressure signal, for projecting said acoustic pressure signal against said object, and for receiving acoustic pressure signals reflected from said object in response to said projected acoustic pressure signals;

receiver means, coupled to said transducer means, for transforming said reflected acoustic pressure signal into an electrical signal;

frequency demodulation means, coupled to said receiver means for frequency demodulating said electrical signal of said receiver means to produce a frequency demodulated signal containing instantaneous frequency deviations from said defined frequency responsive to the scattering properties of stationary and moving structures of said object;

amplitude demodulation means, coupled to said receiver means, for amplitude demodulating said electrical signal of said receiver means to produce an amplitude demodulated signal having amplitude deviations from said defined amplitude responsive to said scattering properties of said object;

circuit means, coupled to said frequency demodulation means and also to said amplitude demodulated signal, for encoding said frequency demodulated signal and said amplitude demodulated signal into a video signal containing acoustic images of stationary and moving structures of said object;

scan converter means, coupled to said video signal and responsive to the position of said transducer means relative to said object, for algorithmically encoding said video signal; and display means, coupled to said scan converter means, for displaying said algorithmically encoded signal, thereby displaying an acoustic image of said object responsive to both frequency and amplitude deviation properties of said object.

* * * * *